(12) United States Patent
Fiala et al.

(10) Patent No.: US 8,449,243 B2
(45) Date of Patent: May 28, 2013

(54) DEVICE AND METHOD FOR AXIALLY DISPLACING A TURBINE ROTOR

(75) Inventors: Andreas Fiala, Munich (DE); Michael Kremmer, Bergkirchen (DE)

(73) Assignee: MTU Aero Engines GmbH, Munich (DE)

( * ) Notice: Subject to any disclaimer, the term of this patent is extended or adjusted under 35 U.S.C. 154(b) by 1279 days.

(21) Appl. No.: 12/089,888

(22) PCT Filed: Oct. 10, 2006

(86) PCT No.: PCT/DE2006/001765
§ 371 (c)(1),
(2), (4) Date: Apr. 10, 2008

(87) PCT Pub. No.: WO2007/041997
PCT Pub. Date: Apr. 19, 2007

(65) Prior Publication Data
US 2008/0247865 A1 Oct. 9, 2008

(30) Foreign Application Priority Data

Oct. 13, 2005 (DE) .......................... 10 2005 048 982

(51) Int. Cl.
*F01D 5/02* (2006.01)
(52) U.S. Cl.
USPC ................. 415/14; 415/34; 415/96; 415/105; 415/130; 415/132; 415/133
(58) Field of Classification Search
USPC ............... 415/14, 34, 96, 104, 105, 107, 129, 415/130, 131, 132, 133
See application file for complete search history.

(56) References Cited

U.S. PATENT DOCUMENTS

| | | | |
|---|---|---|---|
| 1,823,310 A | 9/1931 | Allen | |
| 2,864,244 A | 12/1958 | Prachar | |
| 3,227,418 A * | 1/1966 | West | 415/127 |
| 4,149,826 A * | 4/1979 | Torstenfelt | 415/127 |
| 4,193,741 A | 3/1980 | Briggs | |
| 4,332,523 A * | 6/1982 | Smith | 415/126 |
| 4,744,214 A * | 5/1988 | Monsarrat et al. | 60/226.1 |
| 4,901,523 A * | 2/1990 | Huelster | 60/791 |
| 5,263,816 A * | 11/1993 | Weimer et al. | 415/131 |
| 6,676,372 B2 * | 1/2004 | Scholz et al. | 415/173.2 |
| 6,692,222 B2 * | 2/2004 | Prinz et al. | 415/14 |
| 2002/0009361 A1 * | 1/2002 | Reichert et al. | 415/110 |
| 2003/0215323 A1 | 11/2003 | Prinz et al. | |

FOREIGN PATENT DOCUMENTS

| | | |
|---|---|---|
| DE | 100 53 361 C1 | 6/2002 |
| EP | 1 201 877 A2 | 5/2002 |
| WO | WO 93/20335 | 10/1993 |
| WO | WO 95/29331 | 11/1995 |
| WO | WO 00/28190 | 5/2000 |

* cited by examiner

*Primary Examiner* — Igor Kershteyn
(74) *Attorney, Agent, or Firm* — Crowell & Moring LLP

(57) ABSTRACT

A device and method for axially displacing at least one turbine rotor relative to at least one corresponding turbine stator in a multistage axial turbine is disclosed. The turbine shaft is provided with a split design and has a first axially displaceable shaft half, which is connected via a turbine disc to the turbine rotor and via a torque coupling to the second shaft half. By axially displacing the turbine rotor relative to the turbine stator and by controlling this axial displacement, the operation of the turbine is held in its possible optimum of efficiency.

7 Claims, 2 Drawing Sheets

DEVICE AND METHOD FOR AXIALLY DISPLACING A TURBINE ROTOR

This application claims the priority of International Application No. PCT/DE2006/001765, filed Oct. 10, 2006, and German Patent Document No. 10 2005 048 982.6, filed Oct. 13, 2005, the disclosures of which are expressly incorporated by reference herein.

BACKGROUND AND SUMMARY OF THE INVENTION

The invention relates to a device and a method for axially displacing at least one turbine rotor relative to at least one corresponding turbine stator in a multistage axial turbine.

The efficiency of a multistage axial turbine, in particular with stator and/or rotor synchronization, also called clocking, depends on the axial arrangement of the rotor blades relative to the stator blades. Clocking in turbine stators and turbine rotors means that the respective numbers of blades of the stator or rotor in the grids is the same, and the circumferential position from grid to grid is selected theoretically and experimentally in such a way that optimum turbine efficiency is produced. This optimum turbine efficiency in turn also depends on the axial position of the turbine rotor with respect to the turbine stator.

A clocking or synchronization method is known from European Patent Document EP 0 756 667 B1, in which the wake flow of a first blade grid is guided through a second blade grid with relative movement to the blade leading edge of a third blade grid that is stationary relative to the first, wherein a maximum, circumferential deviation between the wake and the leading edge of ±12.5 percent of the blade pitch is supposed to be permissible.

Additional methods for positioning turbine blade stages are disclosed in German Patent Document DE 100 53 361 C1 and European Patent Document EP 1 201 877 B1.

Moreover, it is known that the efficiency of the turbine may diverge quite a bit from its possible optimum because of construction tolerances, deterioration of turbine components in long-term operation, but also in operating conditions deviating from the design state, for example in the case of partial load/overload or a hot day/cold day.

Finally, turbine noise and the excitation of turbine blade vibrations can be influenced by the undesired axial displacement of the turbine rotor relative to the stator.

The invention is therefore based on the objective of avoiding the above mentioned technical problems of the prior art and making available an adjustment possibility for the distance of the turbine rotor relative to the turbine stator at a standstill and/or in ongoing operation.

The inventive device for axially displacing at least one turbine rotor relative to at least one corresponding turbine stator in a multistage axial turbine has a split turbine shaft with a first axially displaceable shaft half, which is connected via a turbine disc to the turbine rotor and via a torque coupling to the second shaft half. Alternatively, the desired axial displacement can also be achieved by the turbine housing being displaced relative to the turbine rotor, i.e., by the stators being displaced relative to the rotors.

These types of optimized turbine stages can be used in all multistage stationary drives through which air, gas or steam flows for power generation, in ship propulsion, and in the propulsion of land vehicles or aircraft.

By axially displacing the turbine rotor relative to the turbine stator and by regulating this axial displacement, the operation of a turbine is kept at its possible optimum efficiency. For example, in the case of a docked multistage low-pressure turbine for aircraft propulsion with 77000 lbf initial thrust and a bypass ratio of 9, differences between optimum and minimum turbine efficiency of −0.4% to +0.4% are to be expected, i.e., range of 0.8%, if one displaces the rotor in both directions in a range of 4 mm axially relative to the stationary stator. This permits a range in specific fuel consumption of 0.8% and in the turbine inlet temperature of 15° C. to be expected. Operation at optimum turbine efficiency can be assured by the axial rotor displacement and its regulation. In addition, noise and blade vibrations can also be minimized.

An advantageous embodiment of the invention provides for the device to have a sliding stub for axially sliding the two shaft halves over one another. Since the length of the sliding stub limits the displacement path, an initial calculation of the maximum displacement path is meaningful.

An advantageous embodiment of the invention provides for the device to have gearing as the torque coupling. But other positive couplings may also be used in this case as long as they permit axial displacement of the two shaft halves relative to one another.

An advantageous embodiment of the invention provides for the device to have an adjusting chamber. In this case, the adjusting chamber can be a circumferential accommodation for the geared shaft halves (of the hollow turbine shaft) that slide axially over one other, in which a corresponding actuating mechanism is arranged for the axial displacement.

An advantageous embodiment of the invention provides for the adjusting chamber to have a pressure chamber for hydraulic or pneumatic actuation. Oil or fuel for example can be used in this case as hydraulic fluids.

An advantageous embodiment of the invention provides for the device to be actuated mechanically, electromagnetically or piezoelectrically. In this connection, combining the different actuations may be meaningful, for example mechanical actuation with a spring or via lever rod and electromagnetic or hydraulic actuation.

Integrating the function of the device into the function of the fixed bearing of the turbine shaft is also conceivable.

An advantageous embodiment of the invention provides for a displacement path of the split turbine shaft of +4 mm to −4 mm for example for a low-pressure turbine with 77 klbf initial thrust. The displacement path in the cited order of magnitude of +4 mm to −4 mm is expressed as a parameter, which represents the aerodynamic power of a turbine, i.e., identifies its efficiency, and is used as the adjusting and regulating signal.

An advantageous embodiment of the invention provides for a device for regulating the displacement path of the split turbine shaft.

Electronic regulation with a closed control circuit can be provided in this case. In doing so, an advantageous embodiment of the invention provides for sensor devices for recording the actual position of the turbine shaft. With permanently set control parameters for the overall machine such as the rotational speed of the low-pressure and high-pressure shafts, engine pressure ratio, shaft power, net thrust or the like, the efficiency of the turbine is represented by characteristic variables and can be adjusted or regulated by optimizing these variables to the optimum. Such characteristic variables are the ratio of the rotational speeds of the high-pressure and low-pressure shafts, fuel consumption, thrust-specific fuel consumption, shaft-power-specific fuel consumption, exhaust gas temperature, turbine inlet temperature, and the like.

An inventive method for axially displacing at least one turbine rotor relative to at least one corresponding turbine stator in a multistage axial turbine features the following steps:

Determining the actual axial position of the turbine rotor;
Determining the displacement path;
Displacing the turbine rotor.

BRIEF DESCRIPTION OF THE DRAWINGS

Additional measures improving on the invention are described in greater detail in the following along with the description of a preferred exemplary embodiment of the invention on the basis of the figures. The drawings show.

DETAILED DESCRIPTION OF THE DRAWINGS

Figure 1:
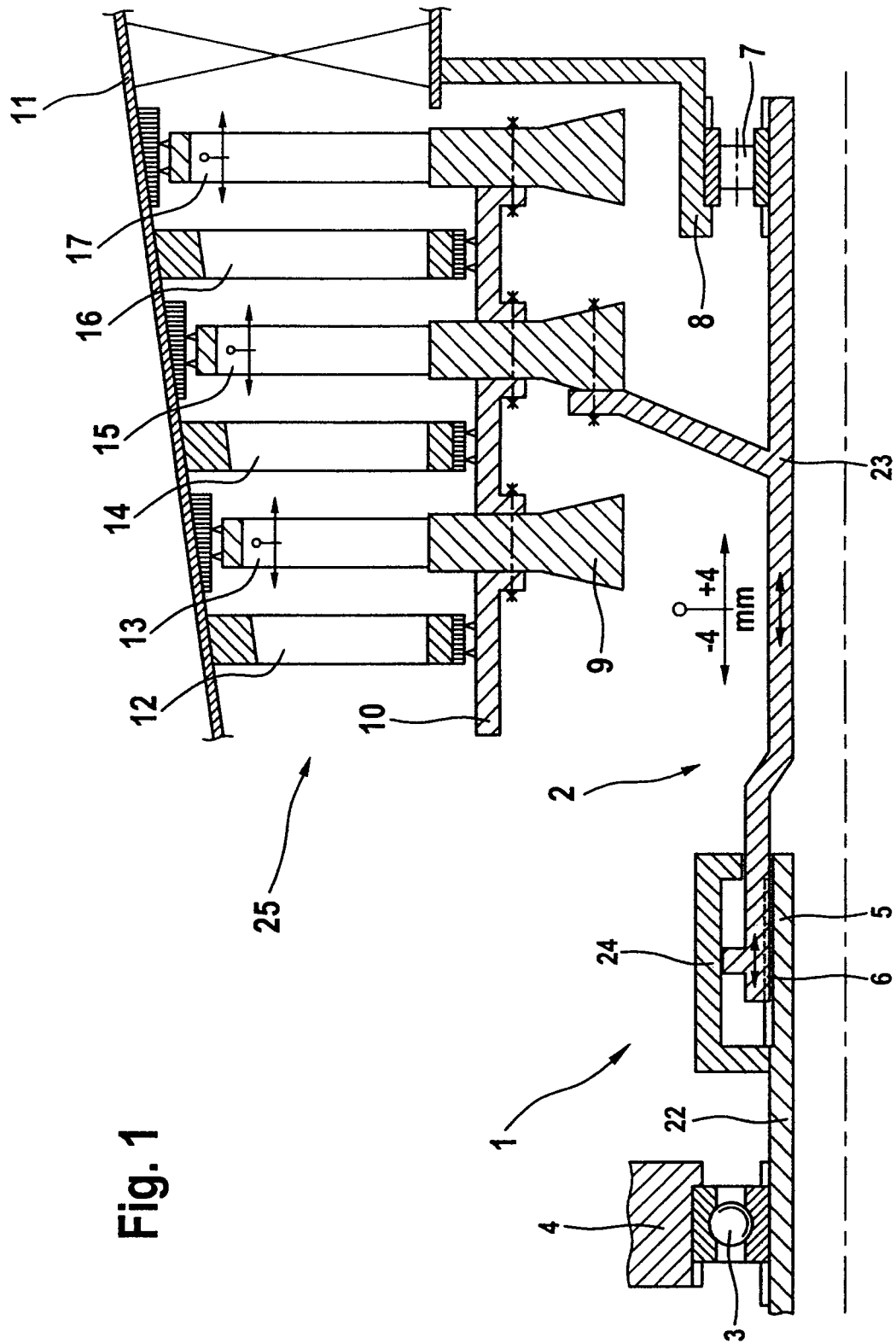
FIG. 1 is a schematic section through a turbine having a displacement mechanism.
Figure 2:
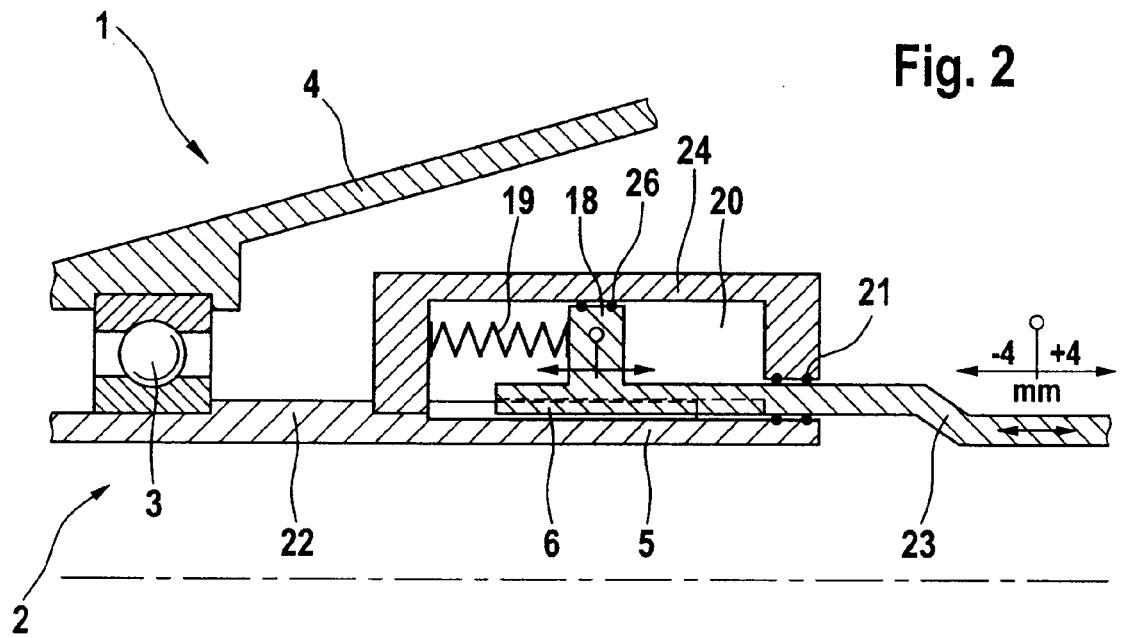
FIG. 2 is a detailed representation of the displacement mechanism in FIG. 1.

FIG. 1 shows a schematic exemplary representation of an embodiment of a device 1 for axially displacing turbine rotors 13, 15, 17 relative to corresponding turbine stators 12, 14, 16 in a multistage axial turbine 25. In this case, the axial turbine 25 has rotor blades connected to sealing rings 10 and turbine discs 9 and stator blades connected to a turbine housing 11. FIG. 2 shows a detailed view of the displacement device 1 from FIG. 1.

A turbine shaft 2 is designed in a split manner between a fixed bearing 3 arranged in a fixed bearing support 4 and a moveable bearing 7 arranged in a bearing support 8 such that the rear shaft half 23 connected to the moveable bearing 7 can be displaced axially with respect to the front shaft half 22 connected to the fixed bearing 3 in a sliding stub 5.

The displacement device 1 in this case is comprised of a chamber 24 arranged on the front shaft half 22, rotating about the shaft circumference and having a rectangular cross section (also see FIG. 2). The rear shaft half 23 is accommodated in the chamber so that it can be displaced axially and the rear shaft half is sealed relative to the chamber 24 with sealing rings 21. Gearing 6 is provided in the chamber 24 between the front shaft half 22 and the rear shaft half 23 to transmit the torque generated by the turbine rotation.

The following design is provided as an example for bearing the axial turbine rotor load. The chamber 24 is split into two areas by a circumferential bar 18, which is firmly connected to the rear shaft half 23, e.g., welded onto it. Arranged over the circumference in the front area of the chamber 24 are coil springs 19, which are supported firstly on the chamber wall and secondly on the bar 18. The bar 18 is sealed vis-à-vis the chamber 24 with sealing rings 26. Moreover, the gap through which the rear shaft half 23 is guided into the chamber 24, is sealed with sealing rings 21. This forms a pressure chamber 20, via which the bar 18 can be pressurized with hydraulic fluid and pressed against the springs 19. When the pressure chamber 20 is deaerated, the springs 19 can displace the bar 18 and thus the rear shaft half 23 in the direction of the moveable bearing 7.

The displacement path in the current exemplary embodiment is −4 mm and +4 mm, calculated from a predefined 0 setting. In this case, first the ACTUAL position of the rotors 13, 15, 17 is compared with the rotor position required for optimal turbine efficiency and an appropriate path of movement is calculated by a regulating device (not shown). Then the displacement mechanism is triggered by the regulating unit and both shaft halves 22, 23 are displaced against each other.

The axial displacement and regulation of the axial displacement of the turbine rotor relative to the axial position of the stationary turbine stator in the range of approx. 4 mm in both directions is thus accomplished by axial elongation or shortening of the turbine shaft, whose one end is axially fixed on the fixed bearing. The axial elongation or shortening is accomplished such that the turbine shaft is axially displaceable on the sliding stub, whereby the torque is transmitted by the gearing.

The axial position of the turbine shaft relative to the sliding stub that is axially fixed on the fixed bearing is specified by a regulated mechanism, which in the present exemplary embodiment is actuated mechanically and hydraulically in a combined manner. In the process, the fixed bearing function and the sliding bearing function may also be combined.

Figure 3:
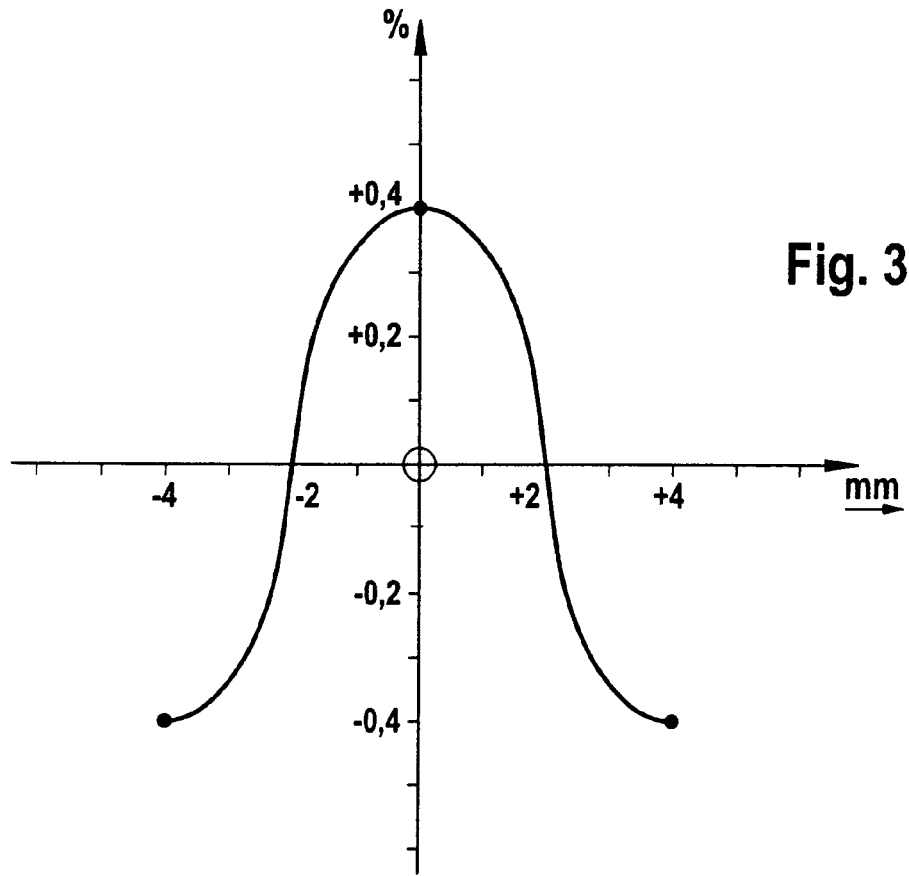
FIG. 3 is a diagram in which the change in the turbine efficiency is represented via the axial displacement of the turbine shaft.

FIG. 3 shows a diagram in which the change in turbine efficiency is depicted in percent over the axial rotor displacement relative to the stator in mm. In this case, an approximately bell-shaped curve is produced, which at both −4 mm and at +4 mm shows a minimum with a change in efficiency of −0.4%. At −2 mm and at +2 mm the change in efficiency is 0. At 0 mm rotor displacement relative to the stator, i.e., at the design point, the change in turbine efficiency reaches an optimum. The change in efficiency in this case is +0.4%.

The invention is not limited in terms of its design to the preferred exemplary embodiment disclosed in the foregoing. In fact, a number of variations are conceivable that make use of the described attainment even with fundamentally different designs.

The invention claimed is:

1. A method for axially displacing a turbine rotor relative to a corresponding turbine stator in a multistage axial turbine, comprising the steps of:
   determining an actual axial position of the turbine rotor;
   determining a displacement path;
   displacing the turbine rotor; and
   electronically regulating the displacement path via user-defined parameters with a closed control circuit.

2. The method according to claim 1, wherein the step of displacing the turbine rotor includes the step of depressurizing a pressure chamber.

3. The method according to claim 2, wherein the pressure chamber is defined by a bar connected to a shaft of the turbine rotor and a chamber that houses the bar.

4. A method for axially displacing a turbine rotor relative to a corresponding turbine stator in a multistage axial turbine, comprising the steps of:
   determining an actual axial position of the turbine rotor;
   determining a displacement path;
   displacing the turbine rotor; and
   regulating the displacement path via user-defined parameters as closed or open regulation;
   wherein the turbine rotor is disposed on a turbine shaft that includes a first half portion and a second half portion and further comprising the step of transmitting a torque between the first half portion and the second half portion by a gearing.

5. The method according to claim 4, wherein the step of displacing the turbine rotor includes the step of moving the first half portion of the turbine shaft relative to the second half portion of the turbine shaft.

6. A multistage axial turbine, comprising:
- a turbine shaft having a first axially displaceable shaft half and a second fixed shaft half, wherein the first axially displaceable shaft half is connected via a turbine disc to a turbine rotor and is connected via a torque axial load coupling to the second fixed shaft half;
- wherein the first axially displaceable shaft half is axially displaceable relative to the second fixed shaft half and to a turbine stator in a turbine stage;
- wherein the torque axial load coupling includes gearing which transmits a torque between the first axially displaceable shaft half and the second fixed shaft half;
- and wherein the gearing is enclosed in a chamber and wherein the chamber partially defines a pressure chamber.

7. The multistage axial turbine according to claim 6, wherein the pressure chamber is defined by a bar connected to the first axially displaceable shaft half and the chamber.

\* \* \* \* \*